United States Patent
Madapathage et al.

(10) Patent No.: US 12,185,777 B2
(45) Date of Patent: Jan. 7, 2025

(54) LATEX DIPPED ARTICLE CONTAINING A NATURAL MINERAL COMPOSITE WITH A MAGNETICALLY DETECTABLE PROPERTY AND METHOD OF MAKING

(71) Applicant: DIPPED PRODUCTS PLC, Colombo (LK)

(72) Inventors: Don Ishani Chandima Madapathage, Sri Lanka (LK); Kariyapperuma Mudiyanselage Yasitha Udayanga Kariyapperuma, Sri Lanka (LK); Hasini Dinushika Dangalle, Sri Lanka (LK); Upul Nishantha Ratnayake, Sri Lanka (LK)

(73) Assignee: DIPPED PRODUCTS PLC, Colombo (LK)

(*) Notice: Subject to any disclaimer, the term of this patent is extended or adjusted under 35 U.S.C. 154(b) by 0 days.

(21) Appl. No.: 17/632,095

(22) PCT Filed: Sep. 23, 2020

(86) PCT No.: PCT/IB2020/058870
§ 371 (c)(1),
(2) Date: Feb. 1, 2022

(87) PCT Pub. No.: WO2021/084335
PCT Pub. Date: May 6, 2021

(65) Prior Publication Data
US 2022/0273058 A1  Sep. 1, 2022

(30) Foreign Application Priority Data

Oct. 30, 2019  (LK) .......................................... 20834

(51) Int. Cl.
*A41D 19/00*  (2006.01)
*C08K 13/02*  (2006.01)
(Continued)

(52) U.S. Cl.
CPC .......... *A41D 19/0058* (2013.01); *C08K 13/02* (2013.01); *C08L 7/02* (2013.01);
(Continued)

(58) Field of Classification Search
CPC .... A41D 19/0058; C08K 13/02; C08K 3/346; C08K 3/36; C08K 3/24; C08K 3/22;
(Continued)

(56) References Cited

U.S. PATENT DOCUMENTS 5,922,482 A    7/1999  De Ricci et al.
7,122,593 B2  10/2006  Lucas et al.
(Continued)

FOREIGN PATENT DOCUMENTS

EP  1 365 665 B1   9/2002
EP  3 009 021 A1   4/2016
(Continued)

OTHER PUBLICATIONS

W. A. P. J. Premaratne et al., "The Processing of Beach Sand from Sri Lanka for the Recovery of Titanium Using Magnetic Separation", Physical Separation in Science and Engineering, vol. 12, No. 1, Jan. 1, 2003, pp. 13-22, , XP055767998, GB ISSN: 1478-6478, DOI:10.1080/1478647031000101232.

(Continued)

*Primary Examiner* — Megha M Gaitonde
(74) *Attorney, Agent, or Firm* — Sughrue Mion, PLLC

(57) ABSTRACT

A latex dipped article, specifically an unsupported glove having magnetically detectable property and its method of manufacturing is disclosed here. The glove contains at least one layer of elastomeric material that consist of a composition of evenly dispersed natural mineral composite containing; magnetite, illmenite, zircorn and quartz. The composition renders the article or small pieces of the latex dipped article magnetically detectable property.

12 Claims, 1 Drawing Sheet

(51) Int. Cl.
*C08L 7/02* (2006.01)
*C08K 3/22* (2006.01)
*C08K 3/34* (2006.01)
*C08K 3/36* (2006.01)
*C08K 5/098* (2006.01)

(52) U.S. Cl.
CPC ............ *C08K 2003/2241* (2013.01); *C08K 2003/2275* (2013.01); *C08K 2003/343* (2013.01); *C08K 3/346* (2013.01); *C08K 3/36* (2013.01); *C08K 5/098* (2013.01); *C08K 2201/01* (2013.01); *C08K 2201/014* (2013.01); *C08L 2201/52* (2013.01)

(58) Field of Classification Search
CPC .. C08K 3/34; C08K 5/098; C08K 2003/2241; C08K 2003/2275; C08K 2003/343; C08K 2201/01; C08K 2201/014; C08L 7/02; C08L 2201/52
See application file for complete search history.

(56) References Cited

U.S. PATENT DOCUMENTS

| | | |
|---|---|---|
| 2004/0154072 A1 | 8/2004 | Connor |
| 2005/0119387 A1 | 6/2005 | Lucas et al. |
| 2007/0083977 A1 | 4/2007 | Lucas et al. |
| 2016/0150840 A1 | 6/2016 | Enomoto et al. |

FOREIGN PATENT DOCUMENTS

| | | |
|---|---|---|
| WO | WO-8700828 A1 * | 2/1987 |
| WO | 2010/046789 A1 | 4/2010 |

OTHER PUBLICATIONS

International Search Report for PCT/IB2020/058870 dated Feb. 4, 2021.
Written Opinion for PCT/IB2020/058870 dated Feb. 4, 2021.

* cited by examiner

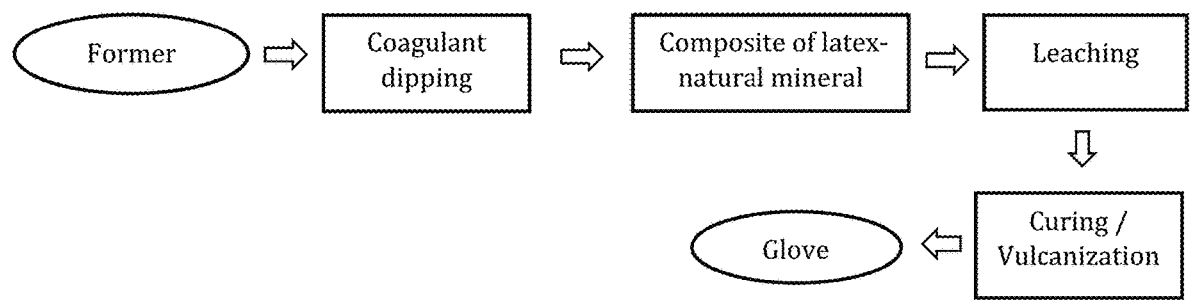

LATEX DIPPED ARTICLE CONTAINING A NATURAL MINERAL COMPOSITE WITH A MAGNETICALLY DETECTABLE PROPERTY AND METHOD OF MAKING

CROSS REFERENCE TO RELATED APPLICATIONS

This application is a National Stage of International Application No. PCT/IB2020/058870 filed Sep. 23, 2020, claiming priority based on Sri Lanka Patent Application No. 20834 filed Oct. 30, 2019, the entire contents of each of which being herein incorporated by reference in their entireties.

FIELD OF INVENTION

The present invention discloses latex dipped article produced with natural mineral composite having magnetic property, when the article exposed to an external magnetic field. The natural mineral composite, a by-product of illmenite separation process from raw mineral sand, has magnetic and non-magnetic components. Magnetic component of the natural mineral composite helps to incorporate the magnetic detectability for latex dipped article. While non-magnetic component helps in reducing the particle size of magnetic components in the natural mineral composite during the preparation of natural mineral composite dispersion. Hence magnetic component present in a unit area increases and improve the sensitivity towards magnetic field.

The latex dipped article specifically glove is made by conventional dipping method with a special dipping in a composite of latex and natural mineral. The concept is applicable to latex dipped gloves used in the food and pharmaceutical industry, where the magnetically detectable property allows the glove or small pieces to be detected in a magnetic field preventing the food/medicine being contaminated by glove pieces.

BACKGROUND OF THE INVENTION

Food handling regulation requirements for the food contact gloves are stringent to preserve the high standards and cleanliness of the food, while retaining organoleptic properties of the food. Vigilance at all levels is necessary to ensure the food safety while keeping foreign matters such as metal fragments, plastic, a piece of rubber particles or any other foreign matter out of food ingredients, food and food packaging.

To avoid the biological contamination of food which caused by bacterial or toxins, it is recommended to wear gloves during the processing stages where biological contamination taking place. However, it is important to prevent contamination of food through small pieces of gloves that could go into the food when processing.

When the color of the food handling gloves is in white or light color, distinguishing the glove pieces that contaminated with the food is often very difficult. Therefore, it is very difficult to avoid the physical contamination of the food when pieces of gloves comes off as a result of tearing during the operation, in the processing stages prior to shipping the finished products.

Therefore, color of the food contact gloves used for the food processing applications should be in contrast of the color of the food product to avoid the contamination caused by the glove pieces by visual detection. However, depending on the visual detection to avoid the contamination with glove pieces is not possible when the small pieces of glove are concerned.

Electromagnetic detection is a common method for the detection of metal pieces in food processing industry to avoid any metal contamination. In order to protect the consumers from metal contaminated food, metal contamination of food can selectively be discarded through the electromagnetically detectable inspection. The same principle has been introduced to detect the latex articles/glove pieces contaminated with food.

To eliminate the contamination caused by the rubber pieces, magnetically detectable materials are being incorporated into the glove layers so that the detached glove pieces are detected through a metal detector at the end of the food processing chains. As a result, contaminated food can selectively be discarded by preventing to reach to the end user to a greater extent.

PRIOR ART

Sri Lankan patent 15164 disclose the latex dipped article prepared using an elastomeric/nanoparticle composite having anti-static and magnetic properties. The organo functionalized nano-particle is coated on a neat elastomeric film. Particle size distribution of the nano-particles is narrow size distribution, between 10-25 nm.

The U.S. Pat. No. 5,922,482 discloses a process for preparing a glove containing metal powders selected from nobel metals. The magnetic material has been directly mixed with the natural rubber matrix.

U.S. Pat. No. 20,070,083,977A1/U.S. Pat. No. 7,122,593 discloses the use of magnetically detectable chromium oxide and/or ferrite dispersed throughout the cured latex layer in the latex article and a process for the manufacturing of such articles.

U.S. application No. 20040154072A1 disclose a glove produced from a plastics material containing an evenly dispersed quantity of electromagnetically detectable particles of ferrous oxide, where the electromagnetically detectable particles or powder mixed with the plastisol to produce the latex article representing between 3% and 6% by volume of the mix.

European patent 1365665B1 disclose the electromagnetically detectable powder mixed with the liquid plastisol to produce a relatively homogenous mixture and the quantity of the powder represents between 3% and 6% by volume and the average particle size of the majority of the powder is preferably below 200 microns.

However, except the Sri Lankan patent 15164 all the methods described in prior art do not address the issues related to compatibility between the two matrixes. There are therefore needs for elastomeric articles having magnetic properties that have better compatibility between the electromagnetically detectable material and the latex matrix and with improved detection limits.

In EP 3009021B1 relates to a glove that has incorporate magnetic detectability using different types of ferrite, which includes, nickel ferrite, manganese ferrite, maghemite, magnetite, manganesezincferrite, nickel-zinc ferrite. However, the source of these ferrites is not via natural resource.

SUMMARY OF THE INVENTION

The present invention discloses latex dipped article produced with composite of latex containing natural mineral composite having magnetic property, when the article exposed to an external magnetic field.

The dipped article specifically glove is made by conventional dipping method with a special dipping in a composite of latex and natural mineral. The latex dipped article/glove is being prepared using an elastomeric material containing evenly dispersed natural mineral composite. The natural mineral composite comprises magnetic and non-magnetic components where magnetite, illemenite as magnetic constituents and zircon and quartz as non-magnetic constituents.

The magnetic component of the natural mineral helps to incorporate the magnetic detectability while non-magnetic component helps in reducing the particle size and improve the sensitivity.

BRIEF DESCRIPTION OF THE DRAWINGS

FIG. 1 illustrates an example of a process of making a magnetically detectable glove, according to some embodiments.

DETAILED DESCRIPTION OF THE INVENTION

The magnetically detectable latex dipped article, particularly the glove is made using latex, standard sulphur/accelerator/zinc oxide and formulations with the natural mineral composite that confer magnetic detectability. The natural mineral composite is a by-product of the Illemite separation process from raw mineral sand. During Illmenite separation process, magnetite and other minerals having magnetic property are separated as by-products using a permanent magnet where the nonmagnetic mineral separates from the magnetic minerals due to its inherent magnetic property. The constituents are combined in a way that allows the mineral to stay distinct and identifiable. The composition is stated below in Table 1.

Composition of Natural Mineral Composite

TABLE 1

Mineralogical composition of natural mineral composite,

| Constituent | Weight % |
|---|---|
| Magnetic | |
| Magnetite | >86.45 |
| Illmenite | 7.29 |
| Others | 1.79 |
| Non-magnetic | |
| Zircon | 1.87 |
| Quartz | 2.60 |

The dispersion of the natural mineral composite, which has a particle size of 0.15 mm, is prepared by reducing the particle size to 0.5 to 10 micron preferably to below 5 microns. Presence of combination of magnetite and illmenite in reduced particle size, preferably below 5 micron, within a unit area of latex article/glove has increased the electromagnetically detectable property of the article. The surface of the natural mineral composite is organically modified using an anionic surfactant to enhance the compatibility with latex and to reduce the settling of the particles. Anionic surfactants such as natural salt of napthalene sulphonic acid, sodium diisobutyl napthalene sulfonate, alkyls napthalene sulphonate used as dispersing agents. The formulation of the dispersion made from the natural mineral composite is stated in Table 2 below.

TABLE 2

Natural mineral composite dispersion formulation

| Compound | By weight % |
|---|---|
| Natural mineral composite | 45 |
| Bentonite clay | 1.25 |
| TiO2 | 1.75 |
| Anionic surfactants | 3 |
| Water | 49 |

The constituents in the dispersion, magnetite and illemenite are the magnetic constituents which increases the magnetic detectability whilst zircon and quartz are the non-magnetic constituents that helps to reduce the particle size when preparing the natural mineral composite dispersion and thereby improve the magnetic sensitivity of the glove.

Dispersion of electromagnetically detectable natural mineral composite is introduced into the latex material such as natural rubber (NR), synthetic latex such as acrylonitrile butadiene rubber (nitrile rubber), chloroprene latex, synthetic polyisoprene (IR), polyvinyl chloride or blend of two or many different latex types.

Example 1

TABLE 3

Composite of natural rubber latex- natural mineral formulation

| Compound | phr |
|---|---|
| Natural latex | 100 |
| KOH | 0.15 |
| Curing system(sulphur, Accelerators and activators) | 2.26 |
| Potassium salt of Stearate | 2.5 |
| Antioxidant | 0.7 |
| Natural mineral composite dispersion | 50 |
| Color pigment | 0.3 |
| Anti-forming agents | 0.03 |
| Viscosity modifiers | 0.6 |

Example 02

TABLE 4

Composite of nitrile buta diene rubber latex - natural mineral formulation

| Compound | phr |
|---|---|
| Nitrile rubber | 100 |
| Wetting agents | 0.3 |
| KOH | 0.8 |
| Dispersing agents | 0.4 |
| Curing system(sulphur, Accelerators and activators) | 6.2 |
| Antioxidant | 0.75 |
| Antiforming agents | 0.01 |
| Potassium salt of Stearate | 2.5 |
| Natural mineral composite dispersion | 60 |

The method of making the magnetically detectable article follows the conventional steps of glove manufacturing;

and comprising the step of dipping the glove in the composite of latex-natural mineral wherein the at least one layer contains magnetically detectable dispersion in a particle size ranging from 0.5 to 10 micron and have magnetic detectability of 5×5 mm glove fragments detected by a metal detector calibrated for detecting 1.2 mm diameter iron sphere.

FIG. 1 illustrates an exemplary process of making a magnetically detectable glove, according to some embodiments. As illustrated in FIG. 1, the process may include:

Coagulant dipping as an initial step former is dipped in a coagulant which is Calcium nitrate to facilitate the latex film formation.

Dipping of Composite of Latex-Natural Mineral Dipping

Then the former is dipped in the composite of latex-natural mineral to obtain a thin layer on top of the ceramic former.

Leaching

Gloves are leached in water at a temperature of approximately 50° C. to remove water soluble materials and excess calcium nitrate in composite of latex-natural mineral layer.

Curing/Vulcanization

Then the composite of latex-natural mineral layer expose to heat where improve the elasticity and the strength of the final product by vulcanization.

Stripping

Finish product is stripped from the ceramic former manually or automatically.

The glove is made according to the principles of the present invention disclosed. In yet another embodiment, a latex article having multiple-layers may be made wherein a composite of latex-natural mineral is sandwiched between two conventional compounded latex layers.

Processes Described in Example 1 & 2 can be Used to Construct the Glove in Following Ways:

1. Glove is constructed with a single layer of composite of latex-natural mineral
2. Glove is constructed with a double layer where outer layer is with conventional compounded latex and inner layer with composite of latex-natural mineral
3. Glove is constructed with composite of latex-natural mineral is sandwiched between two conventional compounded latex layers
4. Glove is constructed with blend of natural and synthetic latex-natural mineral composite
5. Glove is constructed with combination of natural and synthetic latex layers
6. Glove with a half dipped of composite latex-natural mineral layer on the outer surface/inner surface or to any other length from the fingertips to the cuff
7. Disposable glove version with latex-natural mineral composite material
8. Fabric supported glove, with a composite coating of latex-natural mineral
9. Flock lined glove where the inner layer of the glove with cotton flock line and composite of latex natural mineral Thickness of the glove is varying with the number of dips in the latex-natural mineral composite and the coagulant concentration. In fabric supported glove, particular liners are cuts and sewn or woven. Fabric can be synthetic or natural fibers.

Metal Detection Sensitivity of Glove Made Out of as Per the Example 1 & 2

1. 5×5 mm glove fragments prepared from above constructed gloves were detected by a metal detector calibrated for detecting 1.2 mm diameter iron sphere.
2. Detectability did not vary, along the length of the glove.
3. The dimensions of the fragment detected did not vary along the glove length.
4. 5×5 mm glove fragments were also be detected when it is buried inside a food container.

Thermal Oxidative Stability of Glove Made Out of as Per the Example 1 & 2

The glove having the said behavior, metal detectability does not affect significantly in the un-aged mechanical properties such as tensile, tear or flexibility.

The performance of the glove for un-aged and aged properties is measured according to the ASTM D 412:2016 standard

TABLE 5

Thermal oxidative stability data - Natural rubber-mineral composite layer

| Test Parameter | Un-aged | 70° 7 days aged | Retention % |
|---|---|---|---|
| Tensile strength(MPa) | 31.3 | 23.8 | 76 |
| Elongation at break (%) | 900 | 1000 | 111 |
| Modulus (100%) | 1.0 | 0.6 | 60 |

TABLE 6

Thermal oxidative stability data - NBR latex - natural mineral composite layer

| Test Parameter | Un-aged | 70° 7 days aged | Retention % |
|---|---|---|---|
| Tensile strength (MPa) | 20.4 | 21.3 | 104 |
| Elongation at break (%) | 650 | 800 | 123.7 |
| Modulus (100%) | 1.9 | 1.6 | 84 |

After aging for seven days at 70° C., over 70% of the original performances retained. Detectability does not change significantly with the time. Corrosion caused by the magnetic material in the glove is comparatively low compared to the synthetic magnetite.

What is claimed is:

1. A magnetically detectable latex article comprising at least one layer of an elastomeric material comprising an evenly dispersed natural mineral composite containing magnetite, ilmenite, zircon and quartz,
    wherein the evenly dispersed natural mineral composite comprises >86.45 weight % of magnetite and 7.29 weight % of Ilmenite as main magnetic detectable constituents.

2. The magnetically detectable latex article according to claim 1, wherein the magnetically detectable latex article is a magnetically detectable glove,
    wherein the evenly dispersed natural mineral composite is incorporated into a latex compound of the magnetically detectable glove in the form of a dispersion with a particle size from 0.5 to 5 micron.

3. The magnetically detectable latex article according to claim 1, wherein the evenly dispersed natural mineral composite comprises a magnetic component comprising magnetite and ilmenite, and a non-magnetic component comprising zircon and quartz which act as a grinding medium to reduce a particle size of the evenly dispersed natural mineral composite.

4. The magnetically detectable latex article according to claim 3, wherein the grinding medium improves a sensitivity in terms of the magnetic component in a unit area of the magnetically detectable latex article.

5. The magnetically detectable latex article according to claim 1, comprising multiple layers,
wherein at least one layer of the multiple layers comprises the evenly dispersed natural mineral composite, or at least one layer of the multiple layers or a combination of the multiple layers comprises flock, and
wherein the flock comprises synthetic fibers or cotton, or a blend of the synthetic fibers and cotton fibers.

6. The magnetically detectable latex article according to claim 1, wherein a magnetic detectability of the magnetically detectable latex article does not vary with time.

7. A magnetically detectable glove comprising at least one layer of an elastomeric material comprising an evenly dispersed natural mineral composite containing magnetite, ilmenite, zircon and quartz,
wherein the evenly dispersed natural mineral composite comprises >86.45 weight % of magnetite and 7.29 weight % of Ilmenite as main magnetic detectable constituents.

8. The magnetically detectable glove according to claim 7, wherein the evenly dispersed natural mineral composite is incorporated into a latex compound of the magnetically detectable glove in the form of a dispersion with a particle size from 0.5 to 5 micron.

9. The magnetically detectable glove according to claim 7, wherein the evenly dispersed natural mineral composite comprises a magnetic component comprising magnetite and ilmenite, and a non-magnetic component comprising zircon and quartz which act as a grinding medium to reduce a particle size of the evenly dispersed natural mineral composite.

10. The magnetically detectable glove according to claim 9, wherein the grinding medium improves a sensitivity in terms of the magnetic component in a unit area of the magnetically detectable latex article.

11. The magnetically detectable glove according to claim 7, comprising multiple layers,
wherein at least one layer of the multiple layers comprises the evenly dispersed natural mineral composite, or at least one layer of the multiple layers or a combination of the multiple layers comprises flock, the flock comprising synthetic fibers or cotton, or a blend of the synthetic fibers and cotton fibers.

12. The magnetically detectable glove according to claim 7, wherein a magnetic detectability of the magnetically detectable glove does not vary with time.

* * * * *